US 6,561,334 B2

(12) United States Patent
Stark

(10) Patent No.: US 6,561,334 B2
(45) Date of Patent: May 13, 2003

(54) CLAMPING ROLLER OVERRUNNING CLUTCH

(75) Inventor: Johann Stark, Hochstadt (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/872,694

(22) Filed: Jun. 1, 2001

(65) Prior Publication Data
US 2002/0162719 A1 Nov. 7, 2002

(30) Foreign Application Priority Data

Jun. 2, 2000 (DE) .................... 200 09 895 U

(51) Int. Cl.⁷ ............................................. F16D 41/067
(52) U.S. Cl. ........................................................ 192/45
(58) Field of Search ................... 192/45, 44; 188/82.84

(56) References Cited

U.S. PATENT DOCUMENTS

| 2,973,847 A | * | 3/1961 | Stockton ................... 192/45 |
| 3,937,311 A | * | 2/1976 | Gehrke ...................... 192/45 |
| 4,815,577 A | | 3/1989 | Lederman |
| 5,117,954 A | | 6/1992 | Iga |
| 5,722,521 A | | 3/1998 | Awaji et al. |

FOREIGN PATENT DOCUMENTS

| DE | 1625743 | 4/1972 |
| DE | 2438007 | 2/1975 |
| DE | 2514767 | 10/1975 |
| DE | 3241053 | 5/1984 |
| DE | 3345827 | 6/1985 |
| DE | 4210560 | 4/1998 |

* cited by examiner

Primary Examiner—Richard M. Lorence
(74) Attorney, Agent, or Firm—Muserlian, Lucas and Mercanti

(57) ABSTRACT

The invention concerns an overrunning clutch for receiving a shaft (10), said overrunning clutch comprising an outer ring having clamping surfaces, a cage (5) equipped with clamping rollers (6) and spring elements (8) for suspending the clamping rollers (6) being arranged in the outer ring. The clamping rollers (6) comprise a frustoconical bevel (9) on at least one end face, so that when the shaft (10) is not inserted, the enveloping circle diameter $D_{HK}$ of the conic frustum at its outer end is equal to or larger than the diameter $D_W$ of the shaft (10). This enables an automatic assembly of the entire overrunning clutch because the shaft (10) can be inserted without any problem into the cage (5).

3 Claims, 2 Drawing Sheets

CLAMPING ROLLER OVERRUNNING CLUTCH

FIELD OF THE INVENTION

The invention concerns an overrunning clutch for receiving a shaft, said overrunning clutch comprising an outer ring having clamping surfaces, a cage for guiding clamping rollers and comprising spring elements for suspending the clamping rollers being arranged in the outer ring.

BACKGROUND OF THE INVENTION

An overrunning clutch of the pre-cited type configured as a sleeve-type overrunning clutch is known from DE 42 10 560 C2. This overrunning clutch comprises a chiplessly shaped sleeve having a rim. An inner peripheral surface of the sleeve comprises clamping ramps against which spring-loaded clamping needle rollers guided in a cage bear in the clamped state. To avoid so-called edge abrasion, i.e. a life-reducing overloading of end regions of the clamping rollers, the two opposite end faces of the clamping needle rollers are slightly rounded.

A drawback of this is that, despite this diameter reduction in the end regions of the clamping rollers, assembly problems can arise during automatic assembly. Particularly in the case of a very sharp-edged shaft, the end face of the shaft can collide against the end faces of the clamping rollers when being pushed in axially. Even when rotated in overrunning direction, not all the clamping rollers are turned out of the clamping gaps, so that a trouble-free automatic assembly is not possible. This is due to the fact that in the unassembled state, the springs for the clamping needle rollers press them against the next crossbar or against the next needle retaining element with the result that the clamping contour presses the clamping needles or rollers radially inwards. As a result, the enveloping circle diameter of the unassembled overrunning clutch is smaller than the diameter of the shaft. When the shaft is pushed in axially, a collision takes place between the shaft and the clamping rollers and this can lead to a destruction of the cage or of the entire overrunning clutch arrangement.

In this connection, other clamping rollers likewise having a diameter reduction in their end regions are also known. Thus, for example, DE-OS 16 25 743 describes a clamping roller overrunning clutch in which trumpet-like pegs are arranged on the opposite ends of the clamping rollers. However, these pegs have nothing at all to do with the assembly of the overrunning clutch arrangement but only prevent the clamping rollers from falling out inwards in radial direction. Even DE-OS 25 14 767 and DE 24 38 007 C2 disclose overrunning clutches whose clamping rollers have a reduced diameter in their end regions. Here, too, the purpose is only the retention of the rollers.

OBJECTS OF THE INVENTION

It is therefore an object of the invention to provide a clamping roller overrunning clutch that enables an automatic assembly with the associated shaft without difficulty.

This and other objects and advantages of the invention will become more obvious from the following detailed description.

SUMMARY OF THE INVENTION

The invention achieves the above objects by the fact that the clamping rollers comprise a bevel on at least one end face so that in an uninstalled state of the shaft, the enveloping circle diameter $D_{HK}$ at an outer end of the frustum is equal to or larger than the diameter $D_W$ of the shaft. Through this inventive radial matching of the clamping roller and the shaft, it is guaranteed that the shaft can be pushed in between the clamping rollers without obstruction and, in doing so, presses the clamping rollers radially outward against the inner peripheral surface of the outer ring of the overrunning clutch.

According to a further proposition of the invention, the bevel may be configured with a frustoconical, convex, concave or any other desired shape. In this connection, it is also conceivable to configure the bevel with a combination of straight and curved lines.

Finally, according to another advantageous feature of the invention, the bevel is inclined at an angle of 60 to 75° to the end face of the clamping roller. This assures that as little as possible of the axial clamping surface is lost.

The invention will now be elucidated with reference to one example of embodiment described below.

DETAILED DESCRIPTION OF THE DRAWINGS

Figure 1:
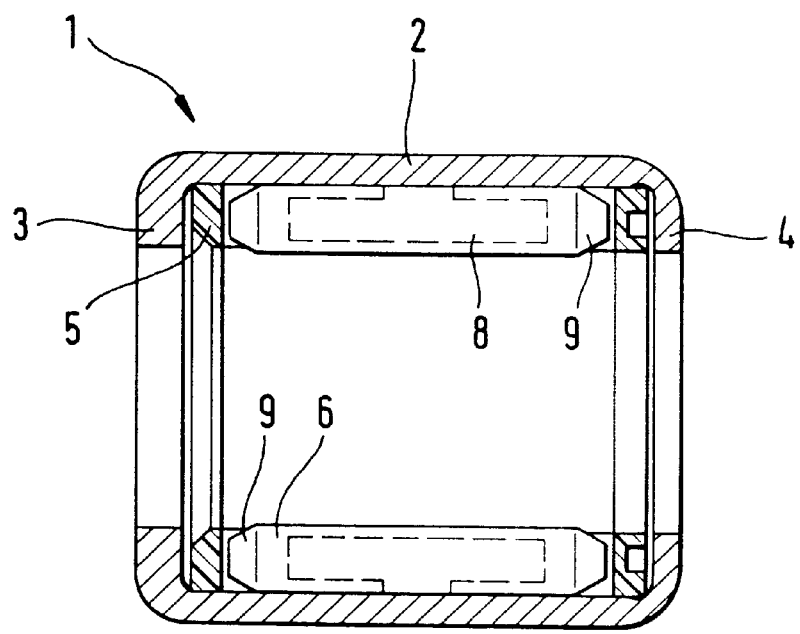
FIG. 1 is a longitudinal cross-section through a sleeve-type overrunning clutch.
Figure 2:
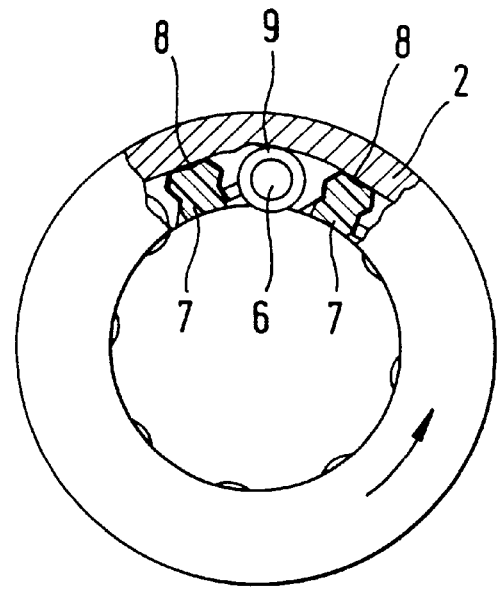
FIG. 2 is a side view of the sleeve-type overrunning clutch of FIG. 1 in partial section.

FIGS. 1 and 2 show the structure of the sleeve-type overrunning clutch 1 whose chiplessly shaped sleeve 2 comprises radially inward oriented rims 3 and 4 at each end. The cage 5 that receives the clamping rollers 6 is arranged between the rims 3 and 4. Spring elements 8 serving to suspend the clamping rollers 6 are fixed on the crossbars 7 of the cage 5.

Figure 3:
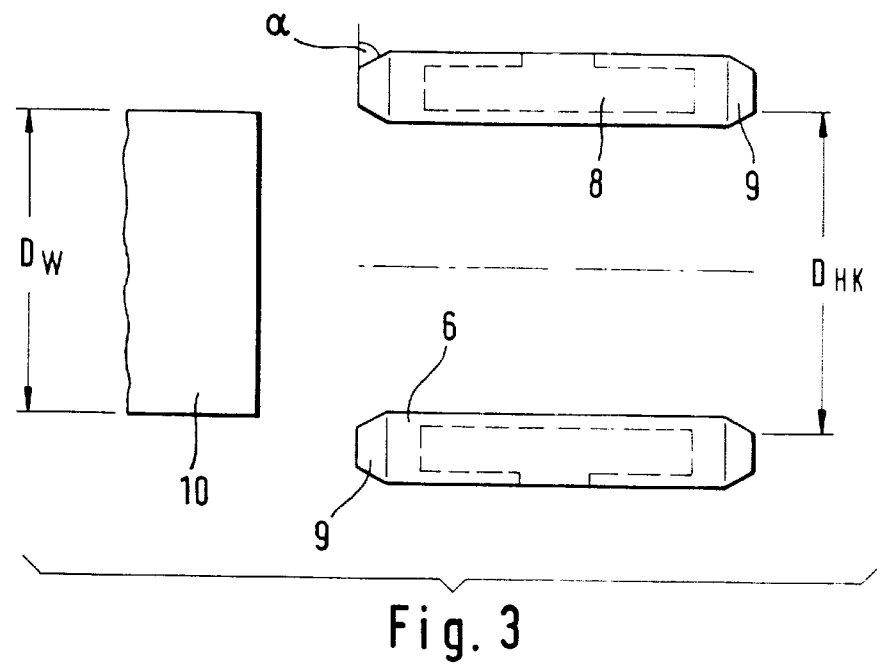
FIG. 3 is a schematic representation of the radial dimension relationship between the clamping rollers and the shaft to be introduced.

As can be seen in FIG. 3, the opposite ends of the clamping rollers 6 comprise frustoconical bevels 9 whose enveloping circle diameter $D_{HK}$ at the end of the clamping rollers 6 is larger than the diameter $D_W$ of the shaft 10, so that the shaft 10 can be inserted without obstruction into the reception opening of the cage 5 defined by the clamping rollers 6 and the crossbars 7. During insertion of the shaft 10, the clamping rollers 6 are displaced radially outward by the shaft 10 toward the inner peripheral surface of the sleeve 2.

Figure 4:
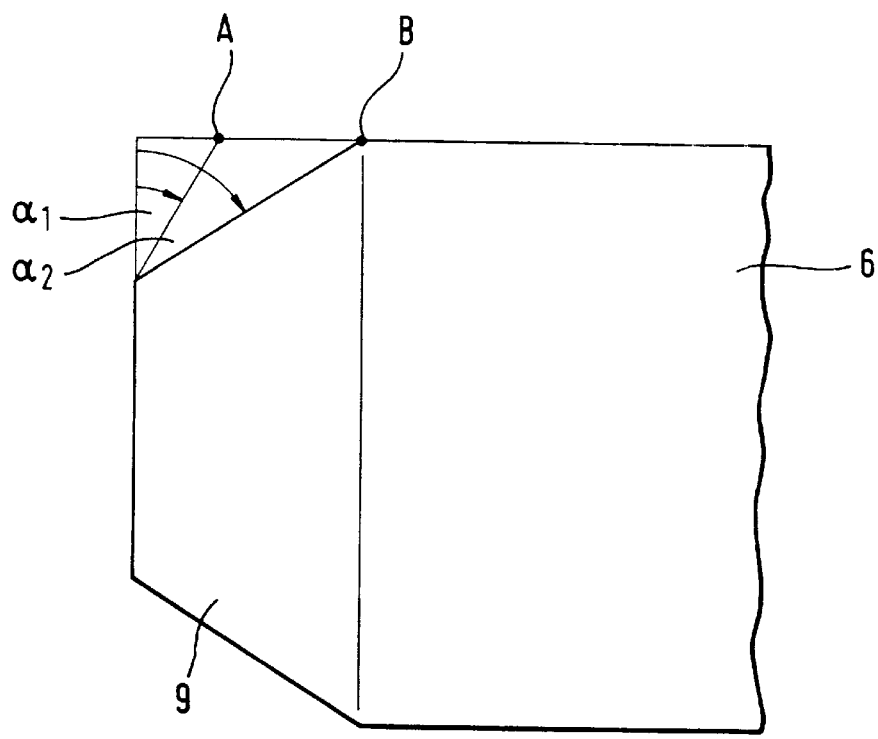
FIG. 4 is an enlarged partial representation of a clamping roller.

As shown in the enlarged representation of the clamping roller 6 in FIG. 4, the frustoconical bevel 9 extends at an angle of inclination $\alpha$ to the end face of the clamping roller 6. It can be seen that with an increasing angle $\alpha$, the peripheral surface of the clamping roller 6 available for clamping becomes smaller. With a smaller angle of inclination $\alpha_1$, the peripheral line extends up to the point A, while with a larger angle of inclination $\alpha_2$, this line extends only up to the point B, i.e. it is shorter.

What is claimed is:

1. A sleeve overrunning clutch for receiving a shaft, comprising an outer ring having clamping surfaces, a cage equipped with clamping rollers and spring elements for suspending the clamping rollers being arranged in the outer ring, wherein the clamping rollers comprise a frustoconical to bevel on at least one end face, so that in absence of an installed shaft, an enveloping circle diameter $D_{HK}$ at an outer end of a frustum of the bevel is equal to or larger than a diameter $D_W$ of the shaft.

2. An overrunning clutch of claim 1, wherein the bevel is inclined at an angle $\alpha$ of 60 to 75° to the end face of the clamping rollers.

3. An overrunning clutch of claim 1 wherein the clamping rollers comprise a frustonical bevel at both ends.

* * * * *